D. AMMEN.

Signal Lantern.

No. 19,332.

Patented Feb. 16, 1858.

UNITED STATES PATENT OFFICE.

DANL. AMMEN, OF THE UNITED STATES NAVY.

SIGNAL-LANTERN.

Specification of Letters Patent No. 19,332, dated February 16, 1858.

*To all whom it may concern:*

Be it known that I, DANIEL AMMEN, of the United States Navy, have invented certain new and useful Improvements in Bowsprit Cap Lanterns; and I do hereby declare that the following is a full, clear, and exact description of the construction and use of the same, reference being had to the accompanying drawing, in which—

Figure 1:
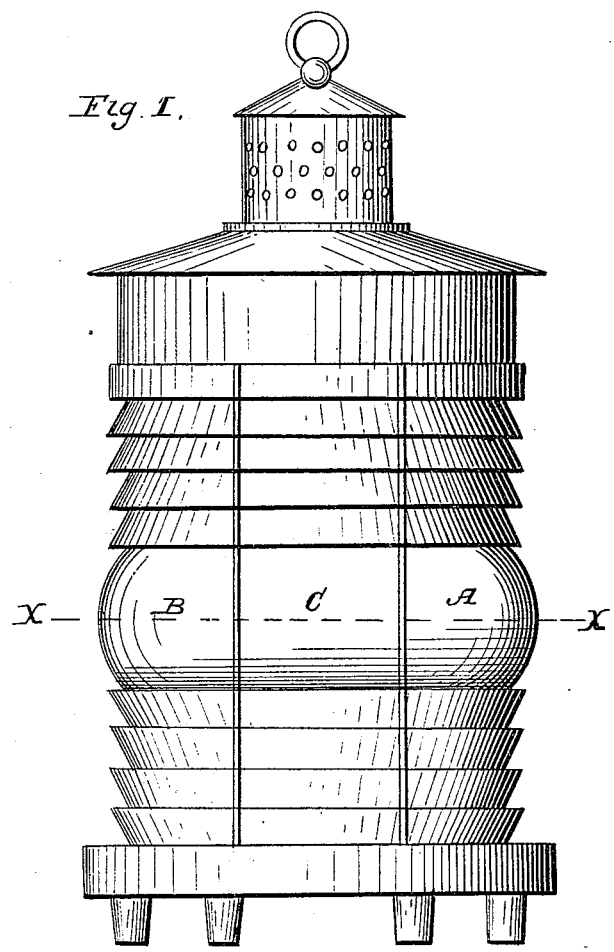
Figure 2:
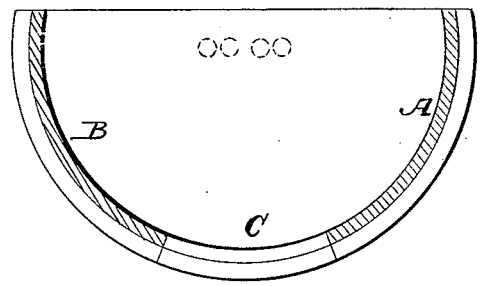

Figure 1 represents a front elevation and Fig. 2 a horizontal section by a plane passing through the line $x\ y$.

Similar letters indicate similar parts throughout.

A and B represent colored glass screens, red on the "port" side and green on the "starboard" side, each subtending arcs of ninety degrees. They are separated by the white arc C of forty-five degrees, the center of which arc is to be directly ahead when the lantern is fixed to the bowsprit cap.

The lantern may be dioptric or catoptric, plain glass, or round lenses, as preferred, provided it be cylindrical or substantially the same, showing the light at the center or the common focus of all the screens surrounding said lantern.

I would now state that I do not wish to confine myself to the precise proportions of 45° for the white glass and 90° for the colored glasses as above set down. My object in giving greater surface to the colored glasses is to equalize the effect of light which is partially absorbed when transmitted through a colored medium and I found that the proportion of 45 to 90 degrees to be the most preferable.

If the lantern used be dioptric, gimbals fitted in the same manner as a marine compass should be employed to keep the lantern in a constantly perpendicular position.

The object of the screens is to define the general course of a vessel by one lantern in the same general manner as is now done by steamers (by regulation) with three lanterns; thus if the view be from within two points of abaft the "port" beam to two points ahead a red light only will be shown by said lantern and from two points on the "port" bow to two points on the "starboard" bow a white light only, and from two points on the "starboard" bow to two points abaft the beam a green light only.

Having now described my improvement, what I claim as my invention and desire to secure by Letters Patent is:

The peculiar construction and arrangement herein described of fixed colored screens or glasses to bowsprit cap lanterns whereby only one color can be seen from any given point at the same time—which consists in the application of fixed red and green glasses or screens, indicating respectively "port" and "starboard" sides, when these colored glasses or screens form arcs of ninety degrees or thereabout upon the cylinder of the lantern and when separated by a white glass or screen forming an arc of forty-five degrees or thereabout, substantially as herein set forth.

DANL. AMMEN.

Witnesses:
W. A. Boss,
WM. DOUGLAS.